United States Patent [19]

Hashimoto et al.

[11] 4,061,938
[45] Dec. 6, 1977

[54] DEVICE FOR GENERATING ELECTRICAL PULSES IN RESPONSE TO SHAFT ROTATION

[75] Inventors: Kiyoshi Hashimoto; Shigeki Kitamura, both of Kadoma, Japan

[73] Assignee: Matsushita Electric Industrial Co., Ltd., Osaka, Japan

[21] Appl. No.: 696,853

[22] Filed: June 16, 1976

[30] Foreign Application Priority Data

June 20, 1975 Japan .................................. 50-76120
Aug. 11, 1975 Japan .................................. 50-97288
Nov. 28, 1975 Japan ................................ 50-143128

[51] Int. Cl.² .................................. H02K 21/12
[52] U.S. Cl. .................................. 310/168; 310/156; 123/117 D
[58] Field of Search .................. 235/103, 98 A; 123/117 D, 146.5 A, 148 CC, 149 C; 310/168, 169–170, 156, DIG. 3; 318/138, 254

[56] References Cited

U.S. PATENT DOCUMENTS

| | | | |
|---|---|---|---|
| 3,600,617 | 8/1971 | Frayer | 310/156 |
| 3,777,196 | 12/1973 | Field | 310/156 |
| 3,903,862 | 9/1975 | Nagasawa | 123/148 CC |
| 3,906,920 | 9/1975 | Hemphill | 123/146.5 A |

*Primary Examiner*—Joseph M. Thesz
*Attorney, Agent, or Firm*—Lowe, King, Price & Markva

[57] ABSTRACT

Two yokes of magnetic material are fixedly attached to opposite axial ends of a magnet which is revolvable about its axis with a revolving shaft, an alternating magnetic field generator is positioned in the magnetic field between the two yokes to generate alternating magnetic field with revolution of the shaft, and a magnetoelectric transducer is provided in the alternating field in order to generate a pulsating electrical signal indicative of the number of the shaft revolutions.

27 Claims, 17 Drawing Figures

4,061,938

DEVICE FOR GENERATING ELECTRICAL PULSES IN RESPONSE TO SHAFT ROTATION

This invention relates generally to a shaft revolution signalling device, and more particularly to such a device wherein an electrical pulsating signal is derived, without any mechanical contact point.

This invention is very useful especially when employed as a controller for ignition timing of an internal combustion engine.

FIGS. 1 and 2 have been attached for perusal with the following description of prior art.

Reference is now made to FIG. 1, in which a conventional revolution signalling device without any mechanical contact point is schematically illustrated. Two magnetic disks 1a and 1b are fixedly provided at a suitable space on a shaft 3. The shaft 3 revolves in synchronism with running of an internal combustion engine, for example. As shown, each of the disks 1a and 1b is provided with a plurality of magnetized sections. A magnetoelectric transducer 4 using, for example, the Hall effect is positioned in the magnetic field between the two magnetic disks 1a and 1b. The transducer 4 generates an electrical pulsating signal, as shown in FIG. 2, due to alternating magnetic fields produced between the disks 1a and 1b with the revolution of the shaft 3.

However, in the above described prior art, some problems are encountered: that is, (1) since the magnetic flux density between the facing magnetized sections is so low the magnitude of the output electrical signal from the transducer 4 is relatively low, and (2) the overall size of the counter is liable to be bulky, etc.

Therefore, an object of the present invention is to provide an improved shaft revolution signalling device which does not use magnetic disks with pluralities of magnetized sections, so that the size of the device can be reduced and a strong magnetic field is derived to assure high output electrical energy from a magnetoelectric transducer.

This and other objects, features and many of the attendant advantages of this invention will be appreciated more readily as the invention becomes better understood by the following detailed description, wherein like parts in each of the several figures are identified by the same reference characters, and wherein:

FIG. 1 schematically illustrates a conventional revolution counter;

Figure 4A:
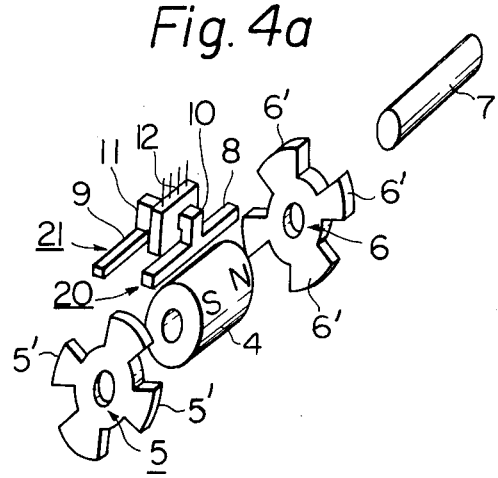
Figure 4B:
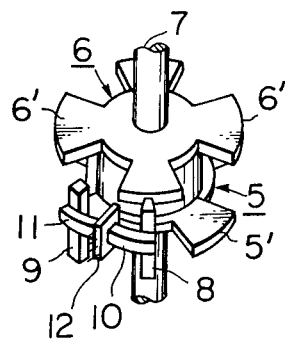
Figure 4C:
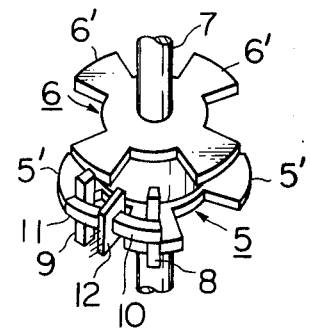
Figure 5:
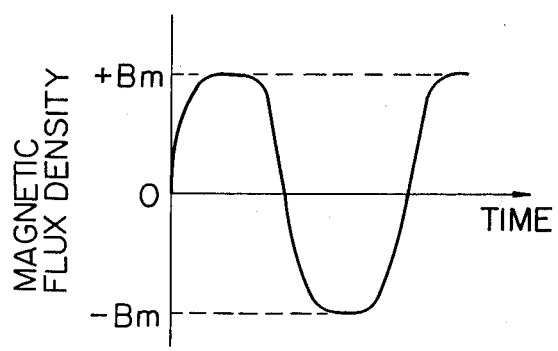
Figure 6A:
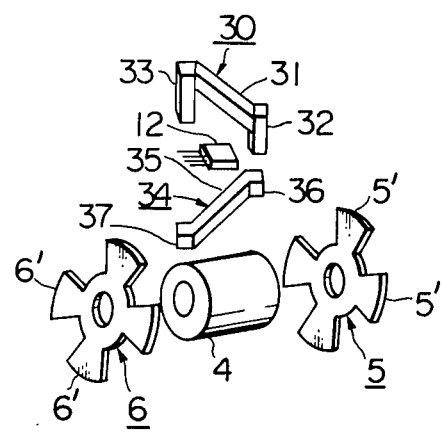
Figure 6B:
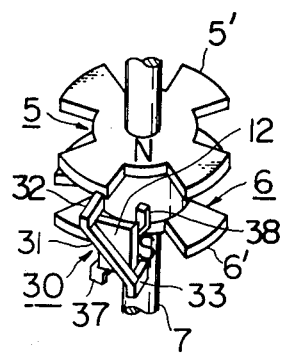
Figure 6C:
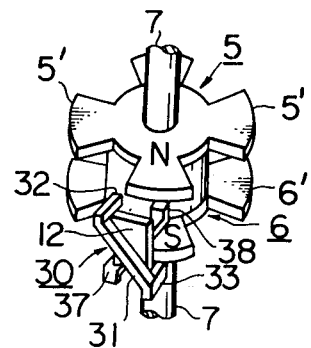
Figure 7:
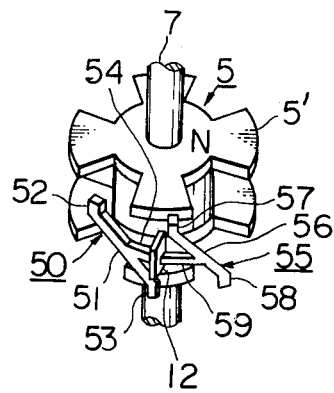
Figure 8A:
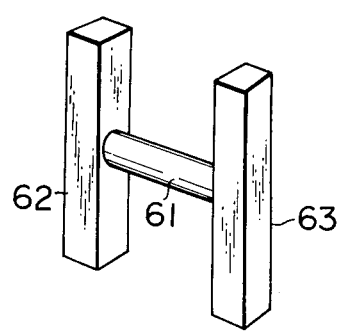
Figure 8B:
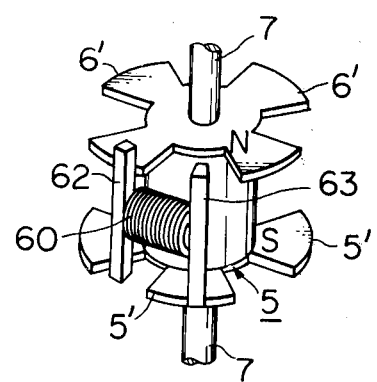
Figure 9A:
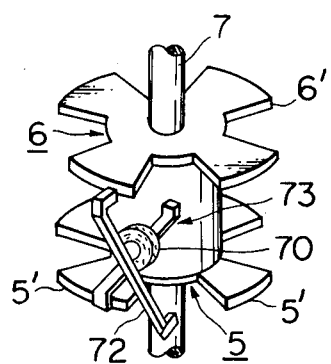
Figure 9B:
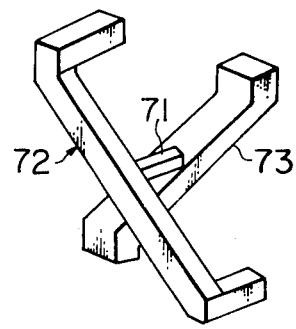
Figure 10:
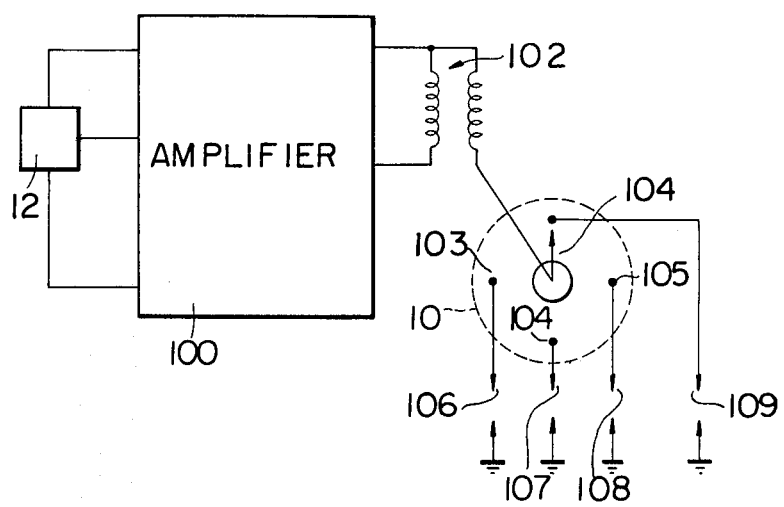

FIGS. 4a-4c schematically illustrate a first preferred embodiment of the present invention;

FIG. 5 is a curve showing the relationship between time and a variation of magnetic flux density obtained by the first preferred embodiment of FIGS. 4a-4c;

FIGS. 6a-6c schematically illustrate a second preferred embodiment of the present invention;

FIG. 7 schematically illustrates a third preferred embodiment of the present invention;

FIGS. 8a-8b schematically illustrate a fourth preferred embodiment of the present invention;

FIGS. 9a-9b schematically illustrate a fifth preferred embodiment of the present invention; and FIG. 10 schematically illustrates an example of application of the present invention.

Figure 3A:
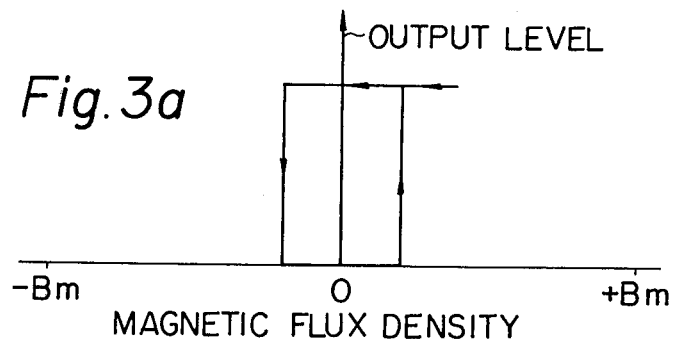
FIGS. 3a and 3b are curves showing the relationship between a variation of magnetic flux density and an output level of a signal from a transducer used in the preferred embodiments of the present invention.
Figure 3B:
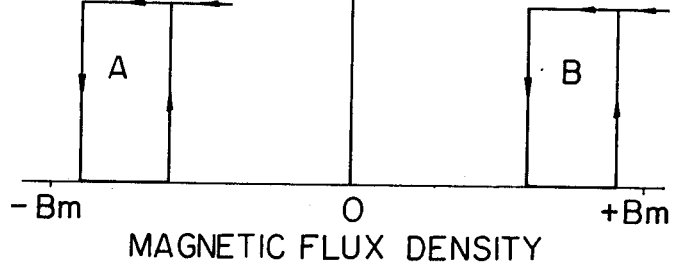

Prior to describing the embodiments of the present invention, reference is made to FIGS. 3a and 3b, in which there are illustrated curves showing the relationship between magnetic flux density and output level of a signal from a magnetoelectric transducer provided in an alternating magnetic field. It is known that the output signal of the magnetoelectric transducer has, in general, histeresis as shown in FIGS. 3a and 3b. FIGS. 3a shows an ideal characteristic curve of the output signal level with respect to variation of magnetic flux density. However, it is usual that the position of the output signal with respect to the magnetic flux density varies with different transducers due to scattering of their characteristics (for example, A or B in FIG. 3b), so that the flux density should vary within a predetermined range such as, for example, from $B_m$ to $-B_m$ in order to assure an output signal from a transducer used.

Therefore, it is important in a shaft rotation signalling device, which uses a magnetoelectric transducer, to readily change the direction of the magnetic flux as well as to obtain a variation of sufficient flux density.

Reference is now made to FIGS. 4a-4c, in which a first preferred embodiment of the present invention is schematically illustrated. A hollow cylindrical magnet 4 is axially magnetized and receives a revolvable shaft 7 in its longitudinal bore (no numeral) so that the shaft and magnet rotate together about a common axis. The shaft 7 revolves in synchronism with running of an internal combustion engine (not shown).

Two magnetic yokes 5 and 6, respectively provided with a plurality of blades 5' and 6' that can be considered as radially extending pole segments, are fixedly attached to opposite axial ends of the magnet 4. The number of blades 5' and 6' is equal to the number of cylinders of the engine. That is, when the engine has four cylinders, there are four each of the blades 5' and 6'. Yokes 5 and 6 are arranged such that each of the blades 5' of the yoke 5 faces or is aligned with a space between two blades 6' of the yoke 6; the spaces can be considered as high magnetic reluctance segmented regions formed between the pole segments. The magnet 4 and the yokes 5 and 6 revolve as shaft 7 turns.

As shown, a low magnetic reluctance path between pole segments 5' and 6' of yokes 5 and 6 is formed by two substantially T-shaped magnetic members 20 and 21 that hold a magnetoelectric transducer 12 between them. Axially extending arms 8 and 9 of the members 20 and 21 are arranged in parallel to each other and include pole faces that are selectively adjacent blades 5' and 6'. Legs 10 and 11 of members 20 and 21 hold the transducer 12 between them. The members 20 and 21 are fixedly attached to a suitable frame (not shown), and positioned in parallel to the axis of the magnet 4 and in the vicinity thereof such that, when one end or pole face of arm 8 faces one of the blades 6', the other end or pole face of arm 9 faces one of the blades 5' of the yoke 5 (FIG. 4b), and, on the other hand, when the other end or pole face of arm 9 faces one of the blades 6', a first end or pole face of arm 8 faces one of the blades 5' of the yoke 5 (FIG. 4c).

In operation, when the yokes 5 and 6 are positioned with respect to the members 20 and 21 as shown in FIG. 4b, the magnetic flux is guided by means of the low reluctance path including upper portion of arm 8, the legs 10 and 11, and the lower portion of arm 9, so that the magnetic flux passes through the magnetoelectric transducer 12 from the right to the left. By contrast, in FIG. 4c, the magnetic flux in turn passes through the transducer 12 from the left to the right.

Figure 1:
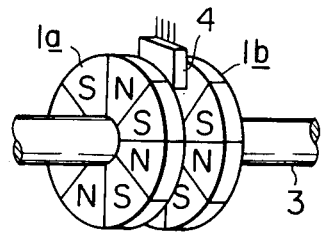
Figure 2:
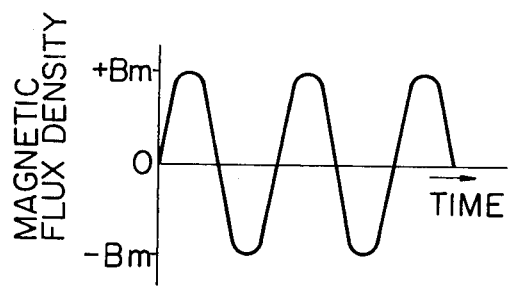
FIG. 2 is a curve showing the relationship between time and a variation of magnetic flux density obtained by the prior art of FIG. 1.

In FIG. 5, there is a curve showing the relationship between time and the variation of the magnetic flux in the first preferred embodiment. In accordance with the present embodiment, sufficient flux can be obtained which varies within the range from $B_m$ to $-B_m$. This is because the magnet 4 has only two poles unlike the magnetic disk 1a or 1b as shown in FIG. 1.

In FIGS. 6a–6c, a second preferred embodiment of the present invention is schematically illustrated. The yokes 5 and 6 in the second preferred embodiment, unlike in the first, are provided in such a manner that each of the blades 5' of the yoke 5 faces each of the blades 6' of the yoke 6. Magnetic members 30 and 34 cross each other as shown in FIGS. 6b and 6c, and holding the magnetoelectric transducer 12 therebetween. The members 30 and 34 consist respectively of rod-like portions 31, 32 33 and 35, 36, 37. The members 30 and 34 are provided in the vicinity of the magnet 4 such that, when the portion 32 faces one of the blades 5' and the portion 37 faces one of the blades 6', the portion 33 does not face any of the blades 6' and also the portion 36 does not face any of the blades 5' (FIG. 6b), whereby a low reluctance path subsists between portions 32 and 37 and flux flows radially through transducer 12 toward shaft 7. However, when the portion 33 faces one of the blades 6' and the portion 36 faces one of the blades 5', the portion 32 does not face any of the blades 5' and also the portion 37 does not face any of the blades 6' (FIG. 6c), whereby a low reluctance path subsists between portions 33 and 36 and flux flows away from shaft 7 through transducer 12.

In FIG. 6b, it is clearly understood that the magnetic flux passes through the magnetoelectric transducer 12 from this (front) side to the other side thereof. By contrast, in FIG. 6c, the magnetic flux in turn passes through the transducer 12 in the reverse direction as compared with in FIG. 6b. Thus, the alternating magnetic flux can be obtained in the magnetoelectric transducer 12 with the revolution of the shaft 7.

Reference is now made to FIG. 7, in which a third preferred embodiment of the present invention is schematically illustrated. The difference between the second and the third embodiments resides in the fact that members 50 and 55 of the latter are not crossed with each other. Magnetic members 50 and 55 are substantially in parallel to each other, consisting respectively of portions 51, 52, 53, 54, and 56, 57, 58, 59. As shown, the magnetoelectric transducer 12 is held between the portions 54 and 59 so flux traverses the transducer arcuately, concentrically with shaft 7, in opposite directions as the shaft rotates. The members 50 and 55 are positioned in the vicinity of the magnet 4 such that, when the portion 53 faces one of the blades 6' and the portion 57 faces one of the blades 5', then the portion 52 does not face any of the blades 5' and also the portion 58 does not face any of the blades 6' (FIG. 7). On the other hand, although not shown in the drawing, when the portion 52 faces one of the blades 5' and the portion 58 faces one of the blades 6', then the portion 53 does not face any of the blades 6' and also the portion 57 does not face any of the blades 5'.

In FIG. 7, it is understood that the magnetic flux passes through the magnetoelectric transducer 12 from the right to the left. Whereas, in the case where the portions 52 and 58 respectively face one of the blades 5' and one of the blades 6', the flux passes through the transducer 12 from the left to the right. Thus, the alternating magnetic flux can be obtained with the revolution of the shaft 7.

FIGS. 8a–8b are schematical illustration of a fourth preferred embodiment of the present invention. This embodiment is a modification of that of FIGS. 4a–4c. That is to say, the magnetoelectric transducer 12, which uses the Hall effect, is replaced by a coil 60 that is wound around a magnetic rod 61. Opposite ends of rod 61 are connected to parallel magnetic legs 62 and 63. It is understood, in view of the description in connection with FIGS. 4a–4c, that the output voltage of the coil 60 alternates with the revolution of the shaft 7. Since the flux density variation is $2B_m$, the output voltage of coil 60 is expressed by: $V_o = 2\, d\phi m/dt$, where $\phi m$ is magnetic flux density. The present embodiment is advantageous in that the output voltage of the coil 60 is two times that of a usual magnetoelectric transducer employing magnetic reluctance variation.

In FIGS. 9a–9b, there is schematically illustrated a fifth preferred embodiment of the present invention that is a modification of the second embodiment. The difference between the second and fifth embodiments is that the transducer 12 of the latter is replaced by a coil 70, that is wound around a magnectic rod 71. The rod 71 is in turn connected to crossed magnetic legs 72 and 73 which are similar to the members 30 and 34 of the second embodiment. The function of the fifth embodiment is similar to that of the second, so further description is omitted for brevity.

In FIG. 10, there is schematically illustrated an application of the present invention to an ignition system of an internal combustion engine. The magnetoelectrical transducer 12 is connected to a suitable amplifier 100 which amplifies the pulsating signal from the transducer 12 to a predetermined level. The amplified signal is fed to a next stage, viz, a high voltage generating transformer 102, in which the voltage fed thereto from the amplifier 100 is elevated to a suitable degree. The high voltage from the transformer 102 is then supplied to a revolvable arm 104 of a distributor 103. The arm 104 revolves in synchronism with the running of the engine (not shown). Thus, as is well known, fixed contacts 103–105 receive in sequence the high voltage from the transformer 102, delivering the high voltage to spark plugs 106–109 each of which is provided in a combustion chamber of the engine.

From the foregoing, it is understood that the present invention has the following significant advantages.

1. The magnet 4 is not provided with a plurality of magnetized sections like the magnetic disk 1a or 1b (FIG. 1), so that a sufficient amount of magnetic flux can be readily obtained.

2. By virtue of the use of the magnet 4, abrupt change of the direction of the magnetic flux is assured. Furthermore, where the coil 60 or 70 is used, the output voltage therefrom is relatively high as indicated supra, so that it is especially advantageous at low engine speeds.

3. The size of the revolution signalling device can be considerably reduced because of the simple magnet 4 is employed.

5. Manufacturing cost of the signalling device is considerably low because such a simple magnet 4 is readily prepared.

What is claimed is:

1. A device for generating electrical pulses each time a shaft turns a revolution, which device comprises:

a magnet having a longitudinal axis and axially magnetized, and secured to said shaft in such a manner as to be revolvable about the axis;

two yokes, each made of magnetic material and having a plurality of blades, said two yokes being fixedly attached to opposite axial ends of said magnet, respectively, and arranged such that each of the blades of one of said two yokes axially faces a space between two blades of the other yoke;

means for coupling an alternating magnetic field between said yokes in an axial direction with revolution of said magnet, which means is provided in the magnetic field between said yokes and includes two rod-like members, said two rod-like members being arranged in parallel to each other and positioned in parallel to said axis and in the vicinity of said yokes such that, when one of the two members faces one of the blades of one of said two yokes, the other member faces one of the blades of the other yoke; and a magnetoelectric transducer magnetically coupled to said means in a manner as to be between the two rod-like members of said means for generating said electrical pulses due to said alternating magnetic field.

2. A device as claimed in claim 1 in which said magnetoelectric transducer is an element using the Hall effect.

3. A device as claimed in claim 1 in which said magnetoelectric transducer is a coil.

4. A device for generating electrical pulses each time a shaft turns a revolution, which device comprises:

a magnet having a longitudinal axis and axially magnetized, and secured to said shaft in such a manner as to be revolvable about the axis;

two yokes, each made of magnetic material and having a plurality of blades, said two yokes being fixedly attached to opposite axial ends of said magnet, respectively, and arranged such that each of the blades of one of said two yokes axially faces each of the blades of the other yoke;

means for coupling an alternating magnetic field between said yokes in an axial direction with revolution of said magnet, which means is provided in the magnetic field between said two yokes and includes two rod-like members, and said two rod-like members being arranged to cross each other and positioned in the vicinity of said yokes, such that, when one of the two members faces one of the blades of one of said two yokes, the other member faces one of the blades of the other yoke; and a magnetoelectric transducer magnetically coupled to said means in a manner as to be between the two rod-like members of said means for generating said electrical pulses due to said alternating magnetic field.

5. A device as claimed in claim 4, in which said magnetoelectric transducer is an element using the Hall effect.

6. A device as claimed in claim 4, in which said magnetoelectric transducer is a coil.

7. A device for generating electrical pulses each time a shaft turns a revolution, which device comprises:

a magnet having a longitudinal axis and axially magnetized, and secured to said shaft in such a manner as to be revolvable about the axis;

two yokes, each made of magnetic material and having a plurality of blades, said two yokes being fixedly attached to opposite axial ends of said magnet, respectively, and arranged such that each of the blades of one of said two yokes axially faces each of the blades of the other yoke;

means for coupling an alternating magnetic field between said yokes in an axial direction with revolution of said magnet, which means is provided in the magnetic field between said two yokes and includes two rod-like members, said two rod-like members being arranged in parallel to each other and positioned to cross with said axis of said magnet such that, when one of the two members faces one of the blades of one of said two yokes, the other member faces one of the blades of the other yoke; and a magnetoelectric transducer magnetically coupled to said means in a manner as to be between the two rod-like members of said means for generating said electrical pulses due to said alternating magnetic field.

8. A device as claimed in claim 7, in which said magnetoelectric transducer is an element using the Hall effect.

9. A device as claimed in claim 7, in which said magnetoelectric transducer is a coil.

10. A device for generating electrical pulses each time a shaft turns a revolution, which shaft revolves in synchrionism with running of an internal combustion engine, and which device comprises:

a magnet having a longitudinal axis and axially magnetized, and secured to said shaft in such a manner as to be revolvable about the axis;

two yokes, each made of magnetic material and having a plurality of blades, the number of the blades of each of said two yokes being the same as the number of cylinders of said internal combustion engine, said two yokes being fixedly attached to opposite axial ends of said magnet, respectively, and arranged such that each of the blades of one of said two yokes axially faces a space between two blades of the other yoke;

means for coupling an alternating magnetic field between said yokes in an axial direction with revolution of said magnet, which means is provided in the magnetic field between said two yokes and includes two rod-like members, said two rod-like members being arranged in parallel to each other and positioned in parallel to said axis and in the vicinity of said yokes such that, when one of the two members faces one of the blades of one of said two yokes, the other member faces one of the blades of the other yoke; and a magnetoelectric transducer magnetically coupled to said means in a manner as to be between the two rod-like members of said means for generating said electrical pulses due to said alternating magnetic field.

11. A device as claimed in claim 10, in which said magnetoelectric transducer is an element using the Hall effect.

12. A device as claimed in claim 10, in which said magnetoelectric transducer is a coil.

13. A device for generating electrical pulses each time a shaft turns a revolution, which shaft revolves in synchronism with running of an internal combustion engine, and which device comprises:

a magnet having a longitudinal axis and axially magnetized, and secured to said shaft in such a manner as to be revolvable about the axis;

two yokes, each made of magnetic material and having a plurality of blades, the number of the blades of each of said two yokes being the same as the number of cylinders of said internal combustion engine, said two yokes being fixedly attached to opposite axial ends of said magnet, respectively, and arranged such that each of the blades of one of said two yokes faces each of the blades of the other yoke;

means for coupling an alternating magnetic field between said yokes with revolution of said magnet, which means is provided in the magnetic field between said two yokes and includes two rod-like members, said two rod-like members being arranged to cross each other and positioned in the vicinity of said yokes such that, when one of the two members axially faces one of the blades of one of said two yokes, the other member axially faces one of the blades of the other yoke; and a magnetoelectric transducer magnetically coupled to said means in a manner as to be between the two rod-like members of said means for generating said electrical pulses due to said alternating magnetic field.

14. A device as claimed in claim 13, in which said magnetoelectric transducer is an element using the Hall effect.

15. A device as claimed in claim 13, in which said magnetoelectric transducer is a coil.

16. A device for generating electrical pulses each time a shaft turns a revolution, which shaft revolves in synchronism with running of an internal combustion engine, and which device comprises:

a magnet having a longitudinal axis and axially magnetized, and secured to said shaft in such a manner as to be revolvable about the axis;

two yokes, each made of magnetic material and having a plurality of blades, said two yokes being fixedly attached to opposite axial ends of said magnet, respectively, and arranged such that each of the blades of one of said two yokes axially faces each of the blades of the other yoke;

means for coupling an alternating magnetic field between said yokes in an axial direction with revolution of said magnet, which means is provided in the magnetic field between said two yokes and includes two rod-like members, said two rod-like members being arranged in parallel to each other and positioned to cross with said axis of said magnet such that, when one of the two members faces one of the blades of one of said two yokes, the other member faces one of the blades of the other yoke; and a magnetoelectric transducer magnetically coupled to said means in a manner as to be between the two rod-like members of said means for generating said electrical pulses due to said alternating magnetic field.

17. A device as claimed in claim 16, in which said magnetoelectric transducer is an element using the Hall effect.

18. A device as claimed in claim 16, in which said magnetoelectric transducer is a coil.

19. A device for generating an electrical signal in response to a shaft rotating comprising a pair of yokes adapted to be fixedly mounted at axially spaced locations along the shaft, means for magnetically polarizing the yokes so that one of the yokes has only a first magnetic polarity and the other yoke has only a second magnetic polarity, each of said yokes including radially extending pole face segments between which high reluctance segmented regions are formed, means for establishing a low reluctance magnetic axial path between a segment of one of said yokes and a segment of the other yoke while the yokes are in a first arcuate position so that magnetic flux flows in a first direction through a portion of the low reluctance path while the yokes are in the first position and for establishing the low reluctance path between a segment of said one yoke and a segment of said other yoke while the yokes are in a second arcuate position so that the magnetic flux flows in the opposite direction through said portion of the low reluctance path while the yokes are in the second arcuate position, said means for establishing the low reluctance magnetic path being stationary relative to the discs, and means in said portion for deriving an electric signal in response to the magnetic flux flowing through said portion.

20. The device of claim 19 wherein the means for establishing the low reluctance path includes first, second, third and fourth pole faces, said first and second pole faces being respectively adjacent the segments of the first and second yokes between which the path is established while the yokes are in the first arcuate position, the third and fourth pole faces being respectively adjacent high reluctance regions of the first and second yokes while the yokes are in the first arcuate position, said third and fourth pole faces being respectively adjacent the segments of the first and second yokes between which the path is established while the yokes are in the second arcuate position, the first and second pole faces being respectively adjacent high reluctance regions of the first and second yokes while the yokes are in the second arcuate position.

21. The device of claim 20 wherein corresponding pole face segments of the first and second yokes are arcuately aligned and corresponding high reluctance regions of the first and second yokes are arcuately aligned.

22. The device of claim 21 wherein the means for establishing the low reluctance path includes first and second high magnetic permeability members, said first member including the first and third pole faces, said second member including the second and fourth pole faces, a region of said portion where the signal deriving means is located being between the members.

23. The device of claim 22 wherein said members include legs which are crossed relative to each other and lie in different planes between which said region is located, said first and second pole faces being respectively adjacent aligned segments of the first and second yokes, and the third and fourth pole faces being respectively adjacent high reluctance regions of the first and second yokes while the yokes are in the first arcuate position, the third and fourth pole faces being respectively adjacent aligned segments of the first and second yokes, the first and second segments being respectively adjacent high reluctance regions of the first and second yokes while the yokes are in the second arcuate position.

24. The device of claim 22 wherein said first and second pole faces are respectively adjacent aligned segments of the first and second yokes while the yokes are in the first arcuate position, said third and fourth pole faces being respectively adjacent non-aligned segments of the first and second yokes, said third and fourth pole faces being arcuately spaced in opposite directions from the first and second pole faces.

25. The device of claim 20 wherein pole face segments of the first yoke are arcuately aligned with high reluctance regions of the second yoke and pole face segments of the second yoke are arcuately aligned with high reluctance regions of the first yoke.

26. The device of claim 25 wherein the means for establishing the low reluctance path includes first and second high magnetic permeability members, said first member including the first and third pole faces, said second member including the second and fourth pole faces, a region of said portion where the signal deriving means is located being between the members.

27. The device of claim 26 wherein said members include legs that lie parallel to each other and extend axially between the yokes so that the first and second pole faces are respectively adjacent segments of the first and second yokes and the third and fourth pole faces are respectively adjacent regions of the first and second yokes while the yokes are in the first arcuate position and the third and fourth pole faces are respectively adjacent segments of the first and second yokes and the first and second pole faces are respectively adjacent high reluctance regions of the first and second yokes while the yokes are in the second arcuate position.

* * * * *